A. MARSHALL.
Running-Gear.
No. 69,686
Patented Oct. 8, 1867
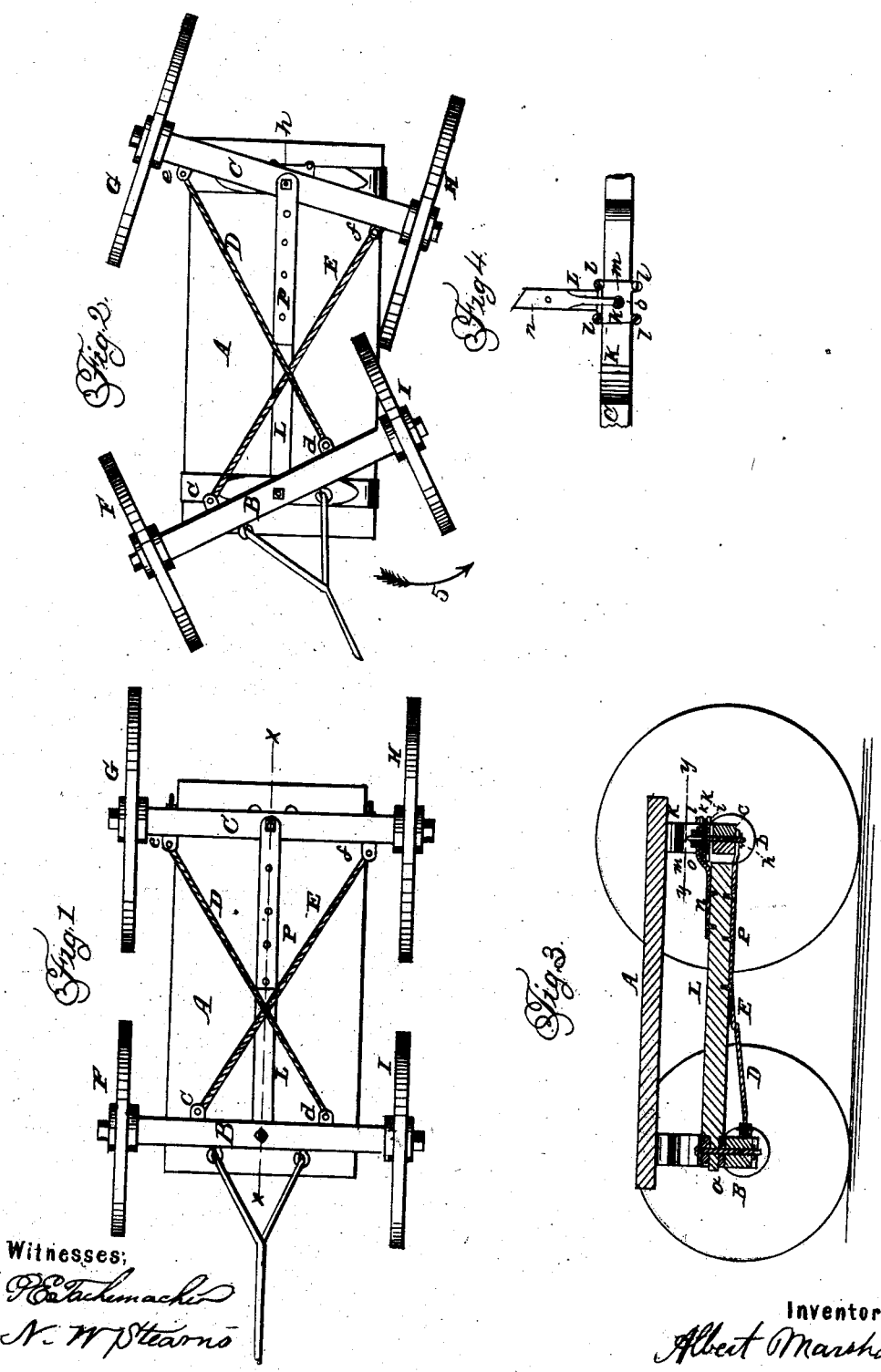
Witnesses:
Inventor:
Albert Marshall

United States Patent Office.

ALBERT MARSHALL, OF METHUEN, MASSACHUSETTS.

Letters Patent No. 69,686, dated October 8, 1867.

IMPROVEMENT IN CARRIAGE-TRUCKS.

The Schedule referred to in these Letters Patent and making part of the same.

TO ALL WHOM IT MAY CONCERN:

Be it known that I, ALBERT MARSHALL, of Methuen, in the county of Essex, and State of Massachusetts, have invented certain Improvements in Carriage-Trucks, of which the following is a full, clear, and exact description, reference being had to the accompanying drawings, making part of this specification, in which—

Figures 1 and 2 are plans of the under side of a carriage representing my improved construction.

Figure 3 is a longitudinal vertical section on the line $x\,x$ of fig. 1.

Figure 4 is a section on the line $y\,y$ of fig. 3.

My invention consists in an improved method of connecting the axles of a carriage by rods, cords, or chains, so that they will both swing simultaneously in a horizontal plane, the power applied to turn the front axle being immediately transmitted by the rods, cords, or chains to the rear axle; both axles being pivoted at the centre of their length to allow them to swing freely to the right or left, as required in turning around a corner, and for greater convenience in entering and alighting from the vehicle  And my invention also consists in an improved method of connecting the rear axle to the perch and spring.

To enable others skilled in the art to understand and use my invention, I will proceed to describe the manner in which I have carried it out.

In the said drawings A is the body of a carriage, the axles B C of which are secured thereto by transom-bolts $a\,b$, which allow the axles to play freely in a horizontal plane.  D E are pieces of wire rope, the ends $c\,d$ of which are secured to the axle B, while their opposite ends $e\,f$ are secured to the axle C; the distance between the point of connection $c\,d$ on the axle B being less than that $e\,f$ on the axle C, for a purpose presently to be explained.  These wire ropes D E are so twisted as to leave eyes at their extremities, by means of which they are secured to the axles.

When the carriage is moved in the direction of the arrow 5, to turn a corner or to pass around an object, the forward axle assumes a direction inclined to the body of the carriage, as seen in fig. 2, and simultaneously therewith the rear axle assumes a direction contrary to that of the front axle, thereby allowing much more room between the wheels F G than is obtained in carriages of the ordinary construction.

By the above-described arrangement and connection of the two axles greater facilities are afforded for entering and alighting from the vehicle, and it may be turned around or backed in a circle of small radius, which a limited space would otherwise prevent, and the liability of upsetting, incident to the old construction, is also avoided.  The rear wheels G H being usually of larger diameter than those F I, the axle C is not allowed to swing back and forth in a horizontal plane so much as the axle B, the wires D E being placed further apart at $e\,f$ than at $c\,d$.  Instead of pieces of wire rope being used to connect the axles, rods or chains may be employed, if preferred.  The above-described method of connecting the axles together, by means of the wires D E, serves to lessen the strain on the transom-bolts.

I will now proceed to describe the manner in which the rear axle C is connected with the perch L and the spring K above, referring particularly to figs. 3 and 4.  To the rear axle C is secured, by means of the bolt $b$ and nut $h$, a plate, $i$, between which and another plate, $k$, of similar form, passes the rear carriage-spring K; the two plates being secured together so as to confine it tightly in place between them by means of four screws $l$, one at each corner, as seen in fig. 4.  From the centre of the plate $k$ projects a pin, $m$, over which fits one end of a bent metal plate, $n$, attached to the upper side of the perch L, a nut, $o$, serving to hold it tightly in place, and the end of a plate, $p$, on the under side of the perch, fits over the lower end of the bolt $b$, where it is secured by the nut $h$.  It will be seen that by means of this arrangement the axle is secured to the perch L, and the spring K to the axle; without having to pass the transom-bolt through the spring, which would tend to weaken and render it liable to break.

Claim.

What I claim as my invention, and desire to secure by Letters Patent, is—

A carriage-truck or bed, constructed substantially as described, for the purpose set forth.

I also claim, in combination with the above, connecting the rear axle to the perch L and spring K, by means of the plates $i\,k\,n\,p$ and bolts $b\,m$, constructed and arranged substantially as described.

ALBERT MARSHALL.

Witnesses:
P. E. TESCHEMACHER,
N. W. STEARNS.